US012774794B2

(12) United States Patent
Myojin

(10) Patent No.: US 12,774,794 B2
(45) Date of Patent: Oct. 27, 2026

(54) LENS FOR VEHICULAR LAMP AND VEHICULAR LAMP

(71) Applicant: Stanley Electric Co., Ltd., Tokyo (JP)

(72) Inventor: Norikatsu Myojin, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 19/104,941

(22) PCT Filed: Aug. 4, 2023

(86) PCT No.: PCT/JP2023/028511
§ 371 (c)(1),
(2) Date: Feb. 19, 2025

(87) PCT Pub. No.: WO2024/043040
PCT Pub. Date: Feb. 29, 2024

(65) Prior Publication Data

US 2026/0063263 A1 Mar. 5, 2026

(30) Foreign Application Priority Data

Aug. 23, 2022 (JP) ................................ 2022-132426

(51) Int. Cl.
*F21S 41/25* (2018.01)
*F21S 41/143* (2018.01)
(Continued)

(52) U.S. Cl.
CPC ............. *F21S 41/25* (2018.01); *F21S 41/143* (2018.01); *F21S 41/663* (2018.01); *F21S 41/153* (2018.01);
(Continued)

(58) Field of Classification Search
CPC ......... F21W 2102/14; F21W 2102/145; F21W 2102/15; F21S 41/65; F21S 41/663; F21S 41/153
See application file for complete search history.

(56) References Cited

U.S. PATENT DOCUMENTS 4,985,816 A 1/1991 Seko et al.
2016/0033102 A1 2/2016 Hiratsuka et al.
(Continued)

FOREIGN PATENT DOCUMENTS

CN 113124375 A * 7/2021 ........... B60Q 1/1423
EP 3741618 A1 11/2020
(Continued)

OTHER PUBLICATIONS

Machine translation of CN 113124375 A retrieved from the FIT database of PE2E search. (Year: 2025).*
(Continued)

*Primary Examiner* — Colin J Cattanach
(74) *Attorney, Agent, or Firm* — Kenealy Vaidya LLP

(57) ABSTRACT

A lens for vehicular lamp which projects a light distribution image including a non-irradiation area which does not irradiate a mask object and an irradiation area which irradiates other areas, wherein the lens for vehicular lamp is configured to clearly project a first non-irradiation area for masking at least a mask object that exists at a long distance in a vicinity of an intersection of a horizontal line and a vertical line in the light distribution image onto a first location that is a first distance away in an optical axis direction of the lens for vehicular lamp, and a second non-irradiation area for masking at least a mask object that exists at a close distance laterally displaced from an intersection of the horizontal line and the vertical line in the light distribution image onto a second location.

14 Claims, 6 Drawing Sheets

(51) Int. Cl.

| | |
|---|---|
| ***F21S 41/153*** | (2018.01) |
| ***F21S 41/65*** | (2018.01) |
| ***F21S 41/663*** | (2018.01) |
| ***F21W 102/14*** | (2018.01) |
| ***F21W 102/145*** | (2018.01) |
| ***F21W 102/15*** | (2018.01) |

(52) U.S. Cl.

CPC .......... *F21S 41/65* (2018.01); *F21W 2102/14* (2018.01); *F21W 2102/145* (2018.01); *F21W 2102/15* (2018.01)

(56) References Cited

U.S. PATENT DOCUMENTS

| | | | | |
|---|---|---|---|---|
| 2020/0088374 | A1 | 3/2020 | Kogure et al. | |
| 2020/0180504 | A1* | 6/2020 | Kim ...................... | F21S 41/285 |

FOREIGN PATENT DOCUMENTS

| | | | |
|---|---|---|---|
| JP | H01-244934 | A | 9/1989 |
| JP | 2004-210125 | A | 7/2004 |
| JP | 2005-183327 | A | 7/2005 |
| JP | 2015-58802 | A | 3/2015 |
| JP | 2016-34785 | A | 3/2016 |
| JP | 2018-198113 | A | 12/2018 |
| JP | 2020-191270 | A | 11/2020 |
| JP | 2021-140936 | A | 9/2021 |

OTHER PUBLICATIONS

International Serch Report for PCT/JP2023/028511 mailed on Oct. 10, 2023.

Writtten Opinion for PCT/JP2023/028511 mailed on Oct. 10, 2023.

* cited by examiner

LENS FOR VEHICULAR LAMP AND VEHICULAR LAMP

This application is a U.S. National Stage Application under 35 U.S.C § 371 of International Patent Application No. PCT/JP2023/028511 filed Aug. 4, 2023, which claims the benefit of priority under 35 U.S.C. § 119 to Japanese Patent Application No. 2022-132426 filed Aug. 23, 2022, the disclosures of all of which are hereby incorporated by reference in their entireties.

TECHNICAL FIELD

The present disclosure relates to a lens for a vehicular lamp and a vehicular lamp, and more specifically, to a lens for a vehicular lamp and a vehicular lamp capable of clarifying not only a light-dark boundary line of a non-irradiation area for masking a mask object (e.g., a preceding vehicle) that exists at a long distance in a vicinity of an intersection of a horizontal line and a vertical line, but also a light-dark boundary line (a light-dark boundary line between a non-irradiation area and an irradiation area) of a non-irradiation area for masking a mask object (e.g., an oncoming vehicle) that exists at a close distance laterally displaced from an intersection of a horizontal line and a vertical line.

BACKGROUND ART

In the field of vehicular lamps, there is known a variable light distribution type vehicular lamp fixture capable of detecting the position (for example, right angle and left angle) of a mask object (for example, a preceding vehicle or an oncoming vehicle), setting a non-irradiation area where the mask object portion is not illuminated based on the detected position of the mask object, and forming a light distribution pattern that includes the set non-irradiation area and an irradiation area for illuminating other regions in the high beam area (see, for example, Patent Literature 1).

CITATION LIST

Patent Literature

Patent Literature 1: Japanese Unexamined Patent Application Publication No. 2015-58802

SUMMARY OF INVENTION

Technical Problem

As a result of careful examination, the present inventor has found a problem that, in the vehicular lamp described in Patent Document 1, the light-dark boundary line (the light-dark boundary line between the non-irradiation area and the irradiation area) of the non-irradiation area for masking an object to be masked (For example, the preceding car) existing at a long distance near the intersection of the horizontal line and the vertical line becomes clear, while the light-dark boundary line of the non-irradiation area for masking an object to be masked (For example, oncoming traffic) existing at a short distance laterally away from the intersection of the horizontal line and the vertical line becomes unclear.

The present disclosure has been made in order to solve such problems, and it is an object of the present disclosure to provide a lens for vehicular lamp and a vehicular lamp capable of clarifying not only a light-dark boundary line of a non-irradiation area for masking a mask object (e.g., a preceding vehicle) that exists at a long distance in a vicinity of an intersection of a horizontal line and a vertical line, but also a light-dark boundary line (a light-dark boundary line between a non-irradiation area and an irradiation area) of a non-irradiation area for masking a mask object (e.g., an oncoming vehicle) that exists at a close distance laterally displaced from an intersection of a horizontal line and a vertical line.

Solution to Problem

A lens for vehicular lamp according to the present disclosure which projects a light distribution image including a non-irradiation area which does not irradiate a mask object and an irradiation area which irradiates other areas, wherein the lens for vehicular lamp is configured to clearly project a first non-irradiation area for masking at least a mask object that exists at a long distance in a vicinity of an intersection of a horizontal line and a vertical line in the light distribution image onto a first location that is a first distance away in an optical axis direction of the lens for vehicular lamp, and a second non-irradiation area for masking at least a mask object that exists at a close distance laterally displaced from an intersection of the horizontal line and the vertical line in the light distribution image onto a second location that is a second distance shorter than the first distance away in a direction inclined at a predetermined angle with respect to the optical axis of the lens for vehicular lamp.

With such a configuration, it is possible to clarify not only a light-dark boundary line of a non-irradiation area for masking a mask object (e.g., a preceding vehicle) that exists at a long distance in a vicinity of an intersection of a horizontal line and a vertical line, but also a light-dark boundary line (a light-dark boundary line between a non-irradiation area and an irradiation area) of a non-irradiation area for masking a mask object (e.g., an oncoming vehicle) that exists at a close distance laterally displaced from an intersection of a horizontal line and a vertical line.

Also, in the above-described lens for vehicular lamp, a degree of clarity of a light-dark boundary line between the non-irradiation area that is projected onto the first location and the irradiation area and a degree of clarity of a light-dark boundary line between the non-irradiation area that is projected onto the second location and the irradiation area may be approximately equal.

Also, in the above-described lens for vehicular lamp, wherein the degree of clarity may be a G value.

Another lens for vehicular lamp according to the present disclosure which projects a light distribution image including a non-irradiation area which does not irradiate a mask object and an irradiation area which irradiates other areas, wherein a G value of a light-dark boundary line between the non-irradiation area and the irradiation area, projected at a long distance separated by the first distance from the vehicular lamp lens decreases as a horizontal angle relative to an optical axis of the vehicular lamp lens increases, and a G value of a light-dark boundary line between the non-irradiation area and the irradiation area projected at a near distance that is a second distance shorter than the first distance from the vehicle lamp lens is at its peak when a horizontal angle with respect to an optical axis of the vehicle lamp lens is at a predetermined angle, and becomes smaller as a horizontal angle to an optical axis of the vehicular lamp lens becomes larger than the predetermined angle.

With such a configuration, it is possible to clarify not only a light-dark boundary line of a non-irradiation area for masking a mask object (e.g., a preceding vehicle) that exists at a long distance in a vicinity of an intersection of a horizontal line and a vertical line, but also a light-dark boundary line (a light-dark boundary line between a non-irradiation area and an irradiation area) of a non-irradiation area for masking a mask object (e.g., an oncoming vehicle) that exists at a close distance laterally displaced from an intersection of a horizontal line and a vertical line.

Also, in the above-described lens for vehicular lamp, wherein the maximum value of the G value of a light-dark boundary line between the non-irradiation area and the irradiation area, projected at a long distance separated by the first distance from the vehicular lamp lens and the maximum value of the G value of a light-dark boundary line between the non-irradiation area and the irradiation area projected at a near distance that is the second distance from the vehicle lamp lens may be approximately equal.

Also, in the above-described lens for vehicular lamp, the lens for vehicular lamp may comprise one or more lenses.

A vehicular lamp according to the present disclosure includes any of the above lenses for vehicular lamp as described above and light distribution image forming means for forming the light distribution image on an image surface of the lens for vehicular lamp.

With such a configuration, it is possible to clarify not only a light-dark boundary line of a non-irradiation area for masking a mask object (e.g., a preceding vehicle) that exists at a long distance in a vicinity of an intersection of a horizontal line and a vertical line, but also a light-dark boundary line (a light-dark boundary line between a non-irradiation area and an irradiation area) of a non-irradiation area for masking a mask object (e.g., an oncoming vehicle) that exists at a close distance laterally displaced from an intersection of a horizontal line and a vertical line.

Advantageous Effects of Invention

According to the present disclosure, it is possible to provide a lens for vehicular lamp and a vehicular lamp capable of clarifying not only a light-dark boundary line of a non-irradiation area for masking a mask object (e.g., a preceding vehicle) that exists at a long distance in a vicinity of an intersection of a horizontal line and a vertical line, but also a light-dark boundary line (a light-dark boundary line between a non-irradiation area and an irradiation area) of a non-irradiation area for masking a mask object (e.g., an oncoming vehicle) that exists at a close distance laterally displaced from an intersection of a horizontal line and a vertical line.

DESCRIPTION OF EMBODIMENTS

Hereinafter, a projection lens 10 according to an embodiment of the present disclosure will be described with reference to the accompanying drawings. In the respective drawings, corresponding components will be denoted by the same reference signs and repetitive descriptions will be omitted.

Figure 1:
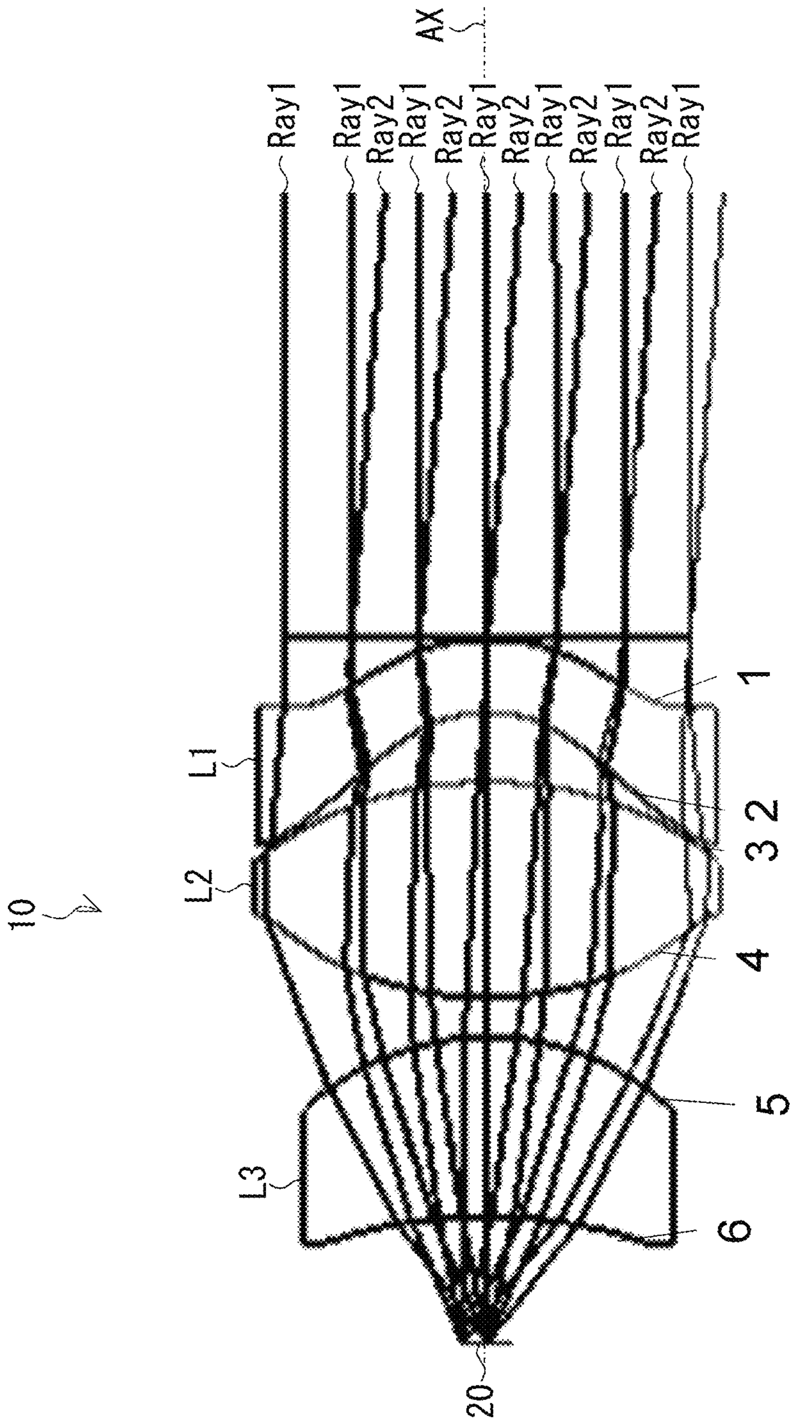
FIG. 1 is a horizontal sectional view of the projection lens 10.
Figure 2:
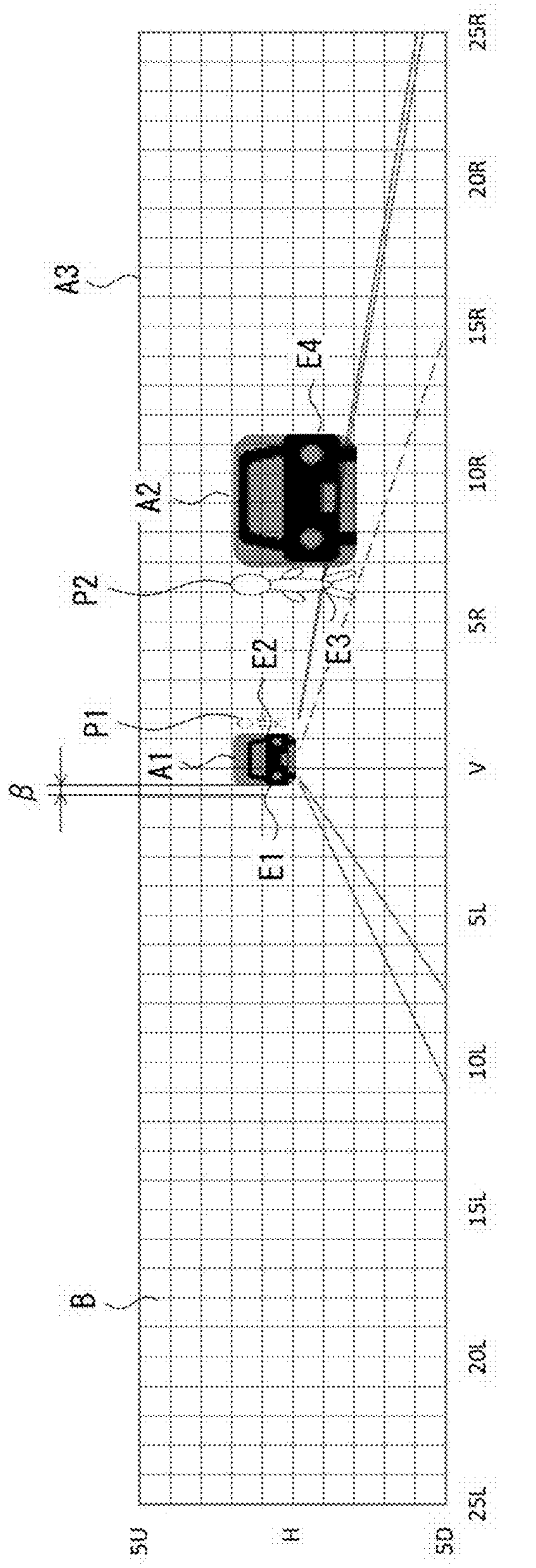
FIG. 2 is an example of a light distribution image projected by the projection lens 10.

FIG. 1 is a horizontal sectional view of the projection lens 10. FIG. 2 is an example of a light distribution image projected by the projection lens 10.

The projection lens 10 is a lens for vehicular lamp that projects a light distribution image including a non-irradiation area (e.g., see non-irradiation areas A1 and A2 in FIG. 2) which does not irradiate a mask object and an irradiation area (e.g., see an irradiation area A3 in FIG. 2) which irradiates other areas. It should be noted that the light distribution image can also be referred to as a light source.

The projection lens 10 is configured to clearly project a first non-irradiation area A1 (including the light-dark boundary lines E1 and E2 between the first non-irradiation area A1 and the irradiation area A3, see FIG. 2) for masking at least a mask object (e.g., a preceding vehicle) that exists at a long distance in a vicinity of an intersection of a horizontal line H and a vertical line V in a light distribution image onto a first location that is a first distance (e.g., 200 meters ahead or at infinite distance) away in an optical axis AX direction of the vehicle lamp lens 10, and a second non-irradiation area A2 (including the light-dark boundary lines E3 and E4 between the second non-irradiation area A2 and the irradiation area A3, see FIG. 2) for masking at least a mask object (e.g., an oncoming vehicle) that exists at a close distance laterally displaced from an intersection of a horizontal line and a vertical line in a light distribution image onto a second location that is a second distance (e.g., 25 m) shorter than the first distance away in a direction inclined at a predetermined angle (e.g., 5 degrees) with respect to the optical axis AX of the vehicle lamp lens 10.

The projection lens 10 is described in detail below.

As shown in FIG. 1, the projection lens 10 is configured by three lenses, L1, L2, and L3, in order to correct aberrations (image plane curvature, etc.). The configuration of the three lenses, L1, L2, and L3, will be described later. It should be noted that the projection lens 10 is not limited to three lenses and may also be configured by one, two, or four or more lenses.

The projection lens 10 projects a light distribution image formed on an image plane 20 (a flat plane) where aberrations (image plane curvature, etc.) have been corrected. The light distribution image includes a non-irradiation area (e.g., see non-irradiation areas A1 and A2 in FIG. 2) which does not irradiate a mask object (e.g., oncoming or preceding vehicles) and an irradiation area (e.g., see the irradiation area A3 in FIG. 2) which irradiates other areas.

The light distribution image may, for example, be formed on a wavelength conversion member (e.g., a yellow phosphor plate) by excitation light (e.g., laser light) that is two-dimensionally scanned by a MEMS (MEMS mirror) (e.g., see JP Application 2021-140936), be formed by a matrix light source that includes semiconductor light-emitting element group arranged in matrix shape (e.g., see JP Application 2020-191270), be formed by an LCD (liquid crystal display) (e.g., see JP Application HEI 1-244934, JP Application 2005-183327), and be formed by a DMD (Digital Mirror Device) (e.g., see JP Application 2016-34785, JP Application 2004-210125). These are examples of the light distribution image formation methods disclosed herein.

Although not shown in the figure, the light distribution image is configured by a plurality of pixels (e.g., 640 pixels in the vertical direction×360 pixels in the horizontal direction) arranged in a grid-like pattern in both the vertical and horizontal directions.

The light distribution image includes a non-irradiation area (e.g., non-irradiation areas A1 and A2 in FIG. 2) where the mask object (e.g., oncoming or preceding vehicles) is not irradiated and an irradiation area (e.g., the irradiation area A3 in FIG. 2) that irradiates other areas. As in Patent Document 1, the non-irradiation area is a non-irradiation area (an area where the light is turned off or dimmed) which is set based on the position (e.g., right angle and left angle) of the mask object (e.g., preceding or oncoming vehicles) and does not irradiate the mask object.

Light emitted from each pixel of the light distribution image and transmitted through the projection lens 10 is irradiated in an angular direction (angular range) corresponding to the position of each pixel with respect to the optical axis AX (extending in the vehicle's front-rear direction; see FIG. 1) of the projection lens 10.

For example, light Ray1 (see FIG. 1) that exits from a reference position of the light distribution image (e.g., the center position of the light distribution image) and is transmitted through the projection lens 10 is irradiated in a direction parallel to the optical axis AX (the direction with a left-right angle of 0 degrees) and moves toward the intersection of the horizontal line H and the vertical line V. Furthermore, for example, light Ray2 (see FIG. 1) that exits from a pixel shifted 5 degrees to the left (left in direction toward front side of the vehicle) relative to the reference position and is transmitted through the projection lens 10 is irradiated in a direction at an angle of 5 degrees to the right with respect to the optical axis AX. Similarly, although not shown, light that exits from a pixel shifted 5 degrees to the right (right in direction toward front side of the vehicle) relative to the reference position and is transmitted through the projection lens 10 is irradiated in a direction at an angle of 5 degrees to the left with respect to the optical axis AX. Similarly, although not shown in the figure, light that exits from other pixels of the light distribution image and is transmitted through the projection lens 10 is irradiated in an angular direction corresponding to the respective pixel positions.

In FIG. 2, reference signs A1 and A2 represent non-irradiation areas. Hereinafter, these are referred to as the first non-irradiation area A1 and the second non-irradiation area A2, respectively. In FIG. 2, the rectangles B (plural) correspond to respective pixels that constitute the light distribution image.

In FIG. 2, the first non-irradiation area A1 represents a non-irradiation area that masks a mask object (in this case, a preceding vehicle) that exists at a long distance in a vicinity of an intersection of the horizontal line H and the vertical line V. On the other hand, the second non-irradiation area A2 represents a non-irradiation area that masks a mask object (e.g., an oncoming vehicle) that exists at a close distance laterally displaced from an intersection of the horizontal line H and the vertical line V. Additionally, in FIG. 2, reference signs E1 and E2 represent light-dark boundary lines, which are the boundary lines between the first non-irradiation area A1 and the irradiation area A3. Hereinafter, they are referred to as light-dark boundary lines E1 and E2. On the other hand, reference signs E3 and E4 represent light-dark boundary lines, which are the boundary lines between the second non-irradiation area A2 and the irradiation area A3. Hereinafter, they are referred to as light-dark boundary lines E3 and E4.

Here, as described above, the projection lens 10 is configured to clearly project the first non-irradiation area A1 (including the light-dark boundary lines E1 and E2 between the first non-irradiation area A1 and the irradiation area A3, see FIG. 2) for masking at least a mask object (e.g., a preceding vehicle) that exists at a long distance in a vicinity of an intersection of the horizontal line H and the vertical line V in a light distribution image onto a first location that is a first distance (e.g., 200 meters ahead or at infinite distance) away in the optical axis AX direction of the vehicle lamp lens 10, and the second non-irradiation area A2 (including the light-dark boundary lines E3 and E4 between the second non-irradiation area A2 and the irradiation area A3, see FIG. 2) for masking at least a mask object (e.g., an oncoming vehicle) that exists at a close distance laterally displaced from an intersection of a horizontal line and a vertical line in a light distribution image onto a second location that is a second distance (e.g., 25 m) shorter than the first distance away in a direction inclined at a predetermined angle (e.g., 5 degrees) with respect to the optical axis AX of the vehicle lamp lens 10.

Therefore, the first non-irradiation area A1 (including the light-dark boundary lines E1 and E2) and the second non-irradiation area A2 (including the light-dark boundary lines E3 and E4) become clear. An explanation of this will be provided with reference to FIG. 3.

Figure 3:
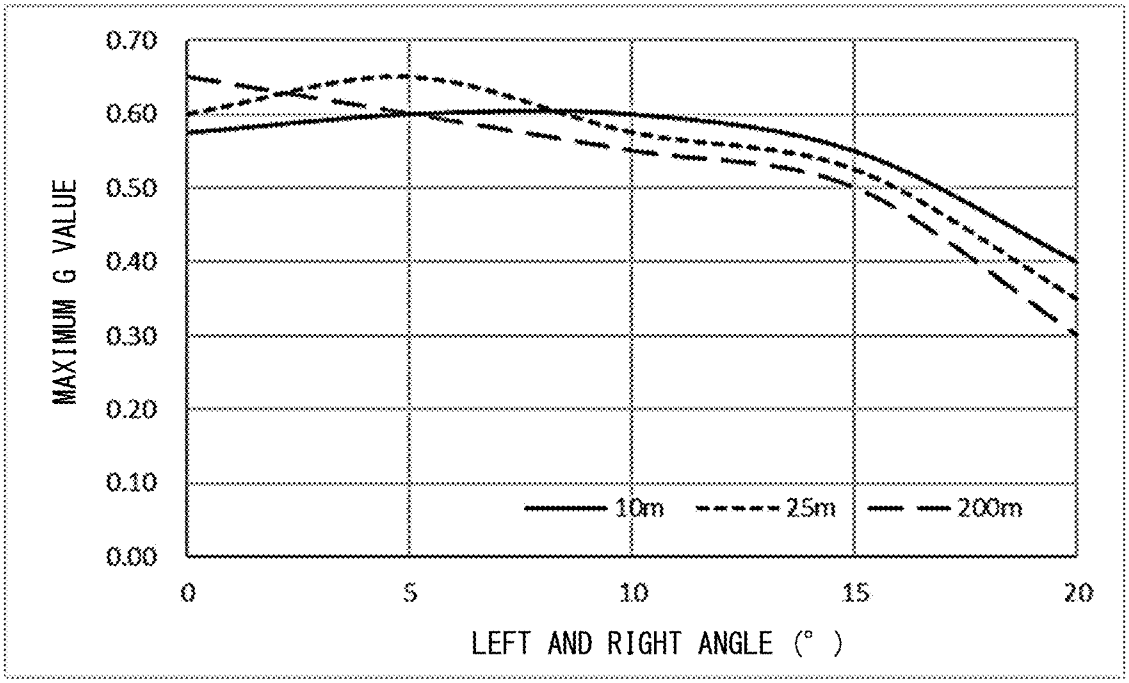
FIG. 3 is a graph (simulation result) showing the relationship between the G value (degree of clarity) of the light-dark boundary lines projected by the projection lens 10 and the left-right angle.

FIG. 3 is a graph (simulation result) showing the relationship between the G value (degree of clarity) of the light-dark boundary lines projected by the projection lens 10 and the left-right angle. In FIG. 3, reference signs P1 and P2 represent pedestrians.

In FIG. 3, the vertical axis represents the maximum G value, while the horizontal axis represents the left-right angle with respect to the optical axis AX. In FIG. 3, the solid line '10 m' represents the maximum G value of the light-dark boundary line projected in each left-right angular direction and at 10 m ahead. Similarly, in FIG. 3, the small dotted line '25 m' represents the maximum G value of the light-dark boundary line projected in each left-right angular direction and at 25 m ahead. Similarly, in FIG. 3, the large dotted line '200 m' represents the maximum G value of the light-dark boundary line projected in each left-right angular direction and at 200 m ahead.

The G value is an indicator of the degree of clarity of the light-dark boundary line, and a higher G value indicates higher the degree of clarity (in other words, more clarity). The G value is calculated using the following formula. However, Eβ represents the luminance (in candela, cd) at an angle β (see FIG. 2).

$$G = (\log E_\beta - \log E_{(\beta+0.1^\circ)}) \quad \text{[Formula 1]}$$

Referring to FIG. 3, it can be understood that the maximum G value when the left-right angle is 0 degrees is maximum or peak (0.67) in 200 m, and the maximum G value when the left-right angle is 5 degrees is maximum (0.65) in 25 m. In other words, it can be understood that the two maximum G values are approximately equal. This indicates that, in FIG. 2, the light-dark boundary lines E1 and E2 projected 200 meters ahead in the direction where the left-right angle is 0 degrees (i.e., the light-dark boundary lines E1 and E2 projected a long distance in a vicinity of an intersection of the horizontal line H and the vertical line V) become clear, and the light-dark boundary lines E3 and E4 projected 25 meters ahead in the direction where the left-right angle is 5 degrees (i.e., the light-dark boundary lines E3 and E4 projected at a close distance laterally displaced from an intersection of the horizontal line H and the vertical line V) also become clear.

As described above, the projection lens 10 is configured such that the G value of the light-dark boundary lines E1 and E2 between the first non-irradiation area A1 and the irradiation area A3, which are projected at a long distance at a first distance (e.g., 200 m) from the projection lens 10, decreases as the left-right angle (an example of the horizontal angle in this disclosure) relative to the optical axis AX of the projection lens 10 increases (see FIG. 3). Furthermore, the projection lens 10 is configured such that the G value of the light-dark boundary lines E3 and E4 between the second non-irradiation area A2 and the irradiation area A3, which are projected at a short distance at a second distance (e.g., 25 m) shorter than the first distance from the projection lens 10, peaks when the left-right angle (an example of the horizontal angle in this disclosure) relative to the optical axis AX of the projection lens 10 is at a predetermined angle (e.g., 5 degrees) and decreases as the left-right angle (an example of the horizontal angle in this disclosure) relative to the optical axis AX of the projection lens 10 increases beyond the predetermined angle (e.g., 5 degrees) (see FIG. 3).

Next, an example configuration (simulation result) of the projection lens 10 (three lenses L1, L2, and L3; see FIG. 1), which is capable of clearly projecting the non-irradiation areas A1 and A2 (light-dark boundary lines E1 to E4) as described above, will be explained.

The lens L3 is a converging lens (meniscus lens). The ratio of the thickness to the width of the lens L3 is greater than 0.5. The lens L3 is a rotating body centered on the optical axis AX. As shown in FIG. 1, the lens L3 includes an incident surface 6 and an exit surface 5. The incident surface 6 is a concave spherical surface, and the exit surface 5 is a convex spherical surface (hemispherical light-emitting refractive surface). The curvature radius of the exit surface 5 is at least twice the thickness of the lens L3.

The lens L2 is a converging lens (double convex lens). The ratio of the thickness to the width of the lens L2 is greater than 0.5. The lens L2 is a rotating body centered on the optical axis AX. As shown in FIG. 1, the lens L2 includes an incident surface 4 and an exit surface 3. The incident surface 4 and the exit surface 3 are each convex spherical surfaces (aspherical-like refractive surface).

The lens L1 is a diverging lens (meniscus lens). The ratio of the thickness to the width of the lens L1 is greater than 0.5. The lens L1 is a rotating body centered on the optical axis AX. As shown in FIG. 1, the lens L1 includes an incident surface 2 and an exit surface 1. The incident surface 2 is a concave spherical surface (aspherical-like refractive surface), and the exit surface 1 is a convex spherical surface (aspherical-like refractive surface).

The following Table 1 shows an example of the lens data for the projection lens 10 (three lenses, L1, L2, and L3).

TABLE 1

| DESIGNATION | SURFACE NUMBER | SHAPE | RADIUS OF CURVATURE | DISTANCE BETWEEN SURFACES | GLASS REFRACTIVE INDEX |
|---|---|---|---|---|---|
| L1 | 1ST SURFACE | ASPHERICAL SURFACE | −15.662 | 0.100 | 1.58 |
| | 2ND SURFACE | ASPHERICAL SURFACE | −11.505 | 6.313 | |
| L2 | 3RD SURFACE | ASPHERICAL SURFACE | −39.446 | 5.912 | 1.50 |
| | 4TH SURFACE | ASPHERICAL SURFACE | 29.761 | 18.250 | |
| L3 | 5TH SURFACE | SPHERICAL SURFACE | −22.980 | 3.309 | 1.65 |
| | 6TH SURFACE | SPHERICAL SURFACE | −42.666 | 15.141 | |

The following formula is an example of the aspherical coefficients.

$$z = \frac{cr^2}{1 + \sqrt{1 - (1 + K)c^2r^2}} + Ar^2 + Br^4 + Cr^6 + Dr^8 + Er^{10} + Fr^{12} + Gr^{14} + Hr^{16}$$ [Formula 2]

$$r = \sqrt{x^2 + y^2}$$

The following Table 2 is an example of the parameters for the above aspherical coefficients.

TABLE 2

| | L1 | | L2 | |
|---|---|---|---|---|
| | 1ST SURFACE | 2ND SURFACE | 3RD SURFACE | 4TH SURFACE |
| 1/c | −15.662 | −11.505 | −39.446 | 29.761 |
| K | −0.96 | −0.91 | −3.89 | −0.42 |
| A | 0 | 0 | 0 | 0 |
| B | −4.25779E−05 | −1.37866E−04 | −6.06798E−05 | 1.25446E−05 |
| C | 5.84544E−07 | 1.70011E−06 | 5.12961E−07 | −1.12161E−07 |
| D | −2.51481E−09 | −7.19756E−09 | −3.08086E−09 | 1.08247E−09 |
| E | 1.06748E−11 | 1.77408E−11 | 1.06099E−11 | −5.23785E−12 |
| F | −2.76142E−14 | −2.56540E−14 | −1.88889E−14 | 1.26972E−14 |
| G | 2.91123E−17 | 1.73977E−17 | 1.33668E−17 | −1.25622E−17 |
| H | 1.19961E−21 | 4.48453E−22 | 1.53744E−23 | −5.39332E−22 |

The conditions of the projection lens 10 (three lenses L1, L2, L3) that can clearly project the non-irradiation areas A1 and A2 (light-dark boundary lines E1 to E4) as described above vary depending on factors such as the number of lenses that make up the projection lens 10, the shapes of the lens surfaces (incident surface, exit surface) of each lens, lens thickness, and their arrangement. Therefore, it is difficult to represent the conditions of the above-mentioned projection lens 10 (three lenses L1, L2, L3) with specific numerical values or the like.

However, by using a predetermined software (for example, OpticStudio) and modifying (adjusting) at least one of the conditions of the projection lens 10 (three lenses L1, L2, L3), and verifying the G value with each change, it is possible to determine the conditions of the projection lens 10 (three lenses L1, L2, L3) (optimization of the projection lens 10).

Next, the effects of the projection lens 10 will be explained with reference to comparative examples for contrast.

Figure 4:
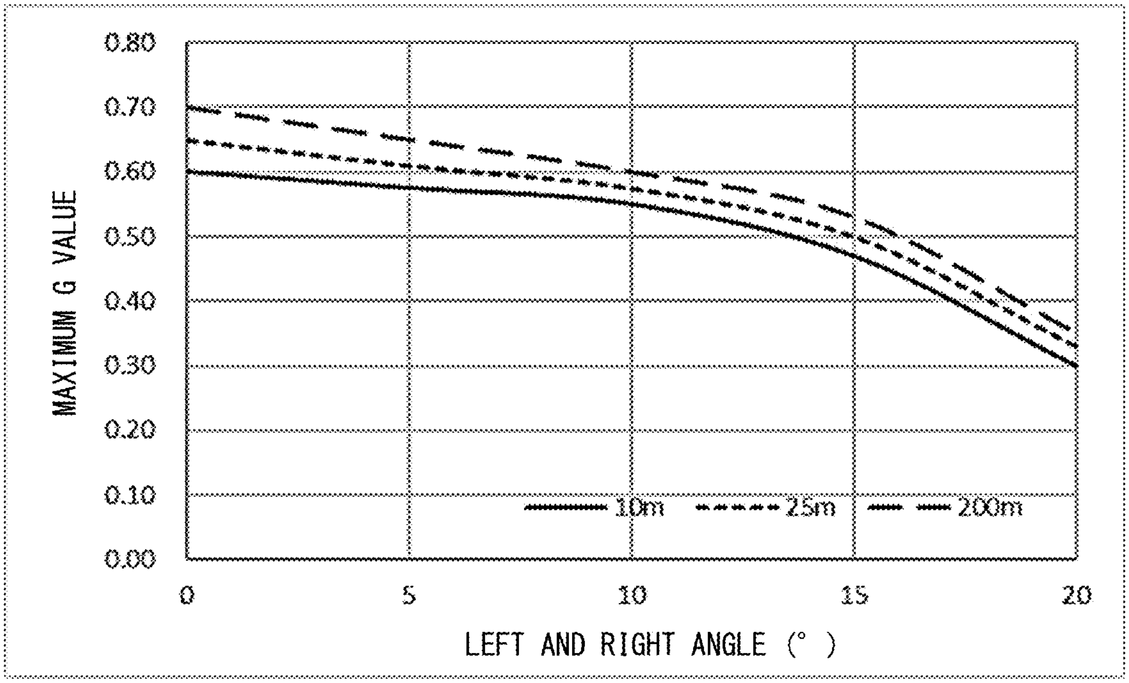
FIG. 4 is a graph (simulation result) showing the relationship between the G value (degree of clarity) of the light-dark boundary line projected by the comparative example projection lens and the left-right angular.

FIG. 4 is a graph (simulation result) showing the relationship between the G value (degree of clarity) of the light-dark boundary line projected by the comparative example projection lens and the left-right angle.

In FIG. 4, the vertical axis represents the maximum G value, while the horizontal axis represents the left-right angle with respect to the optical axis AX. In FIG. 4, the solid line '10 m' represents the maximum G value of the light-dark boundary line projected in each left-right angular direction and at 10 m ahead. Similarly, in FIG. 4, the small dotted line '25 m' represents the maximum G value of the light-dark boundary line projected in each left-right angular direction and at 25 m ahead. Similarly, in FIG. 4, the large dotted line '200 m' represents the maximum G value of the light-dark boundary line projected in each left-right angular direction and at 200 m ahead.

The projection lens of the comparative example is a conventional projection lens, and configured to clearly project the first non-irradiation area A1 (including the light-dark boundary lines E1 and E2 between the first non-irradiation area A1 and the irradiation area A3, see FIG. 2) for masking at least a mask object (e.g., a preceding vehicle) that exists at a long distance in a vicinity of an intersection of the horizontal line H and the vertical line V in a light distribution image onto a first location that is a first distance (e.g., 200 meters ahead or at infinite distance) away in the optical axis AX direction of the vehicle lamp lens 10. In other words, the comparative example projection lens is different from the projection lens 10 of the present embodiment in that it is not configured to project the second non-irradiation area A2 (including the light-dark boundary lines E3 and E4 between the second non-irradiation area A2 and the irradiation area A3, see FIG. 2) for masking at least a mask object (e.g., an oncoming vehicle) that exists at a close distance laterally displaced from an intersection of a horizontal line and a vertical line in a light distribution image onto a second location that is a second distance (e.g., 25 m) shorter than the first distance away in a direction inclined at a predetermined angle (e.g., 5 degrees) with respect to the optical axis AX of the vehicle lamp lens 10.

Referring to FIG. 4, it can be seen that the maximum G value becomes maximum when the left-right angle is 0 degrees at "10 m," "25 m," and "200 m," and that the maximum G value decreases as the left-right angle increases beyond 0 degrees. This indicates that, in FIG. 2, the light-dark boundary lines E1 and E2 projected in the left-right direction of 0 degrees and 200 m ahead (i.e., the light-dark boundary lines projected a long distance in a vicinity of an intersection of a horizontal line and a vertical line) become clear, and the light-dark boundary lines E3 and E4 projected in the left-right direction of 5 degrees and 25 m ahead (i.e., the light-dark boundary lines projected at a close distance laterally displaced from an intersection of the horizontal line H and the vertical line V) also become unclear (to be visually recognized as unclear).

Figure 5:
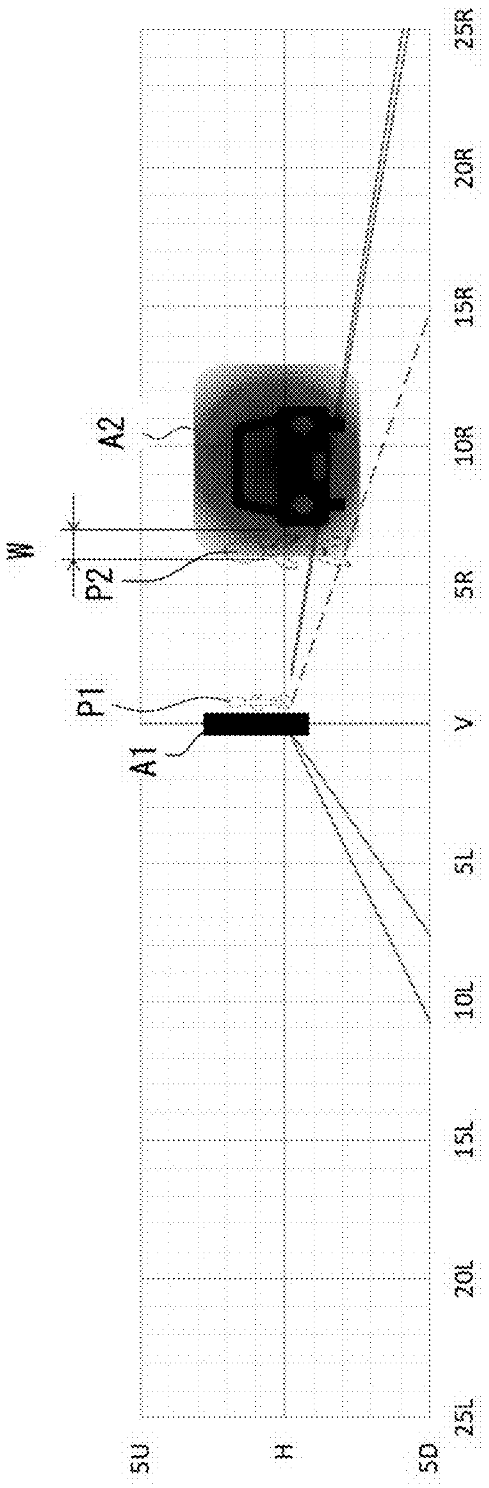
FIG. 5 is a diagram illustrating a state in which the area indicated by the reference sign W, where a pedestrian is present, is unclear (blurred)

In this manner, when the light-dark boundary lines E3 and E4 (i.e., the light-dark boundary lines projected at a close distance laterally displaced from an intersection of a horizontal line and a vertical line) become unclear (blurred), since it is necessary to enlarge the non-irradiation area to avoid causing glare to the mask objects (e.g., preceding or oncoming vehicles), the vicinity of the mask objects (e.g., preceding or oncoming vehicles) becomes dark, resulting in reduced visibility. Therefore, for example, there is a problem in that pedestrians near the mask object (e.g., a preceding vehicle, an oncoming vehicle) may not be noticed, which can become a cause of accidents. FIG. 5 is a diagram illustrating a state in which the area indicated by the symbol W, where a pedestrian is present, is unclear (blurred). In FIG. 5, reference signs P1 and P2 represent pedestrians.

In contrast, the projection lens 10 of the present embodiment has the advantage that, as described above, in addition to the light-dark boundary lines E1 and E2 projected in the left-right direction of 0 degrees and 200 m ahead (i.e., the light-dark boundary lines E1 and E2 projected a long distance in a vicinity of an intersection of the horizontal line H and the vertical line V) projected in the direction of 0 degrees and "200 m" ahead, the light-dark boundary lines E3 and E4 projected in the left-right direction of 5 degrees and 25 m ahead (i.e., the light-dark boundary lines E3 and E4 projected at a close distance laterally displaced from an intersection of a horizontal line and a vertical line) projected in the direction of 5 degrees and "25 m" ahead become clear. Therefore, since the non-irradiation area (e.g., first non-irradiation area A1 and second non-irradiation area A2) can be made small, there is an advantage that light utilization efficiency when projecting the non-irradiation area (e.g., first non-irradiation area A1 and second non-irradiation area A2) is improved. Further, since it is possible to brightly irradiate pedestrians in the vicinity of the mask object (e.g., preceding or oncoming vehicles), there is an advantage that it is possible to recognize pedestrians in the vicinity of the mask object (e.g., preceding or oncoming vehicles) at an early stage, thereby contributing to the reduction of accidents.

Figure 6A:
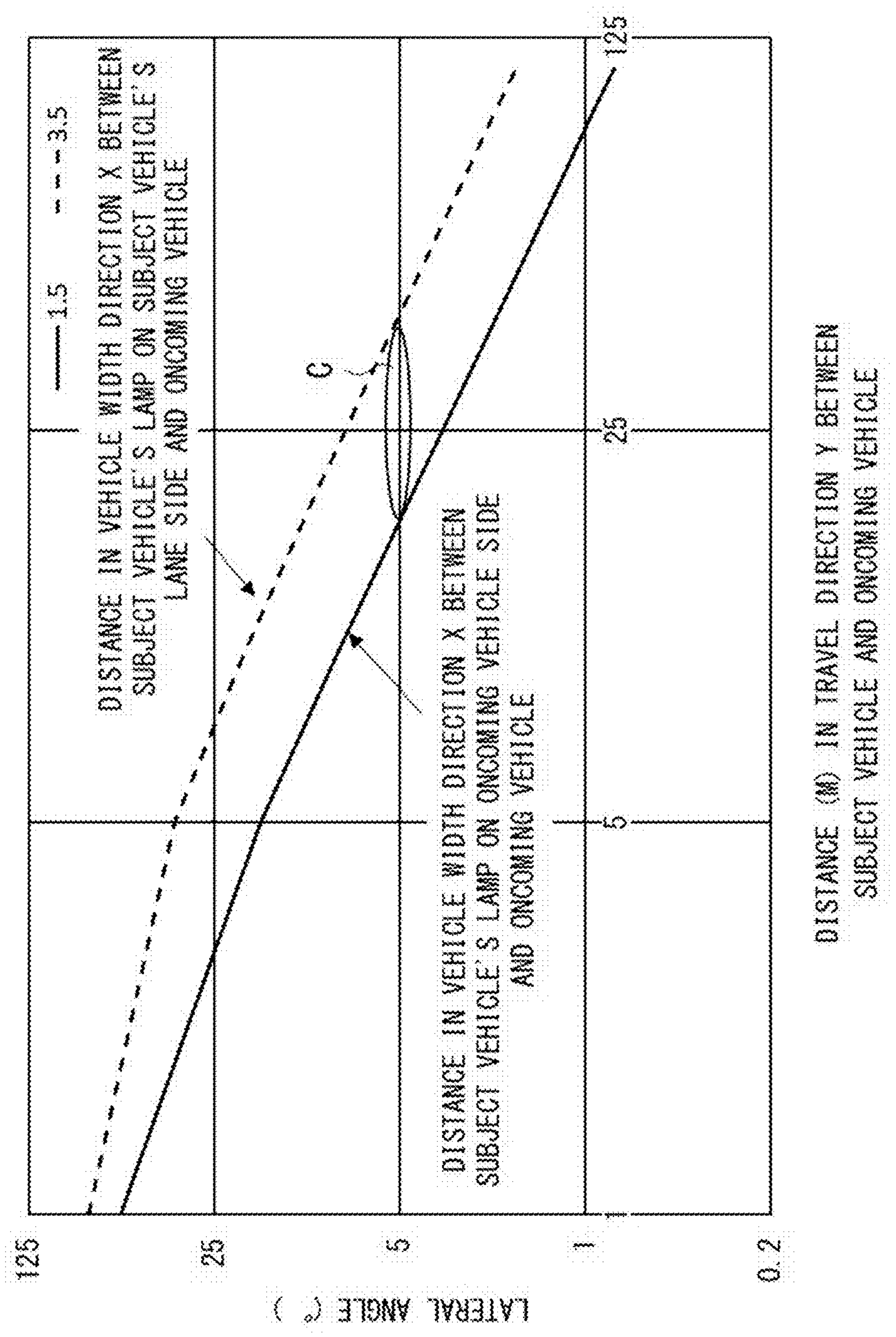
FIG. 6A is a graph (simulation result) showing the relationship between the left-right angle (lateral angle) and distance in travel direction y between subject vehicle and oncoming vehicle.
Figure 6B:
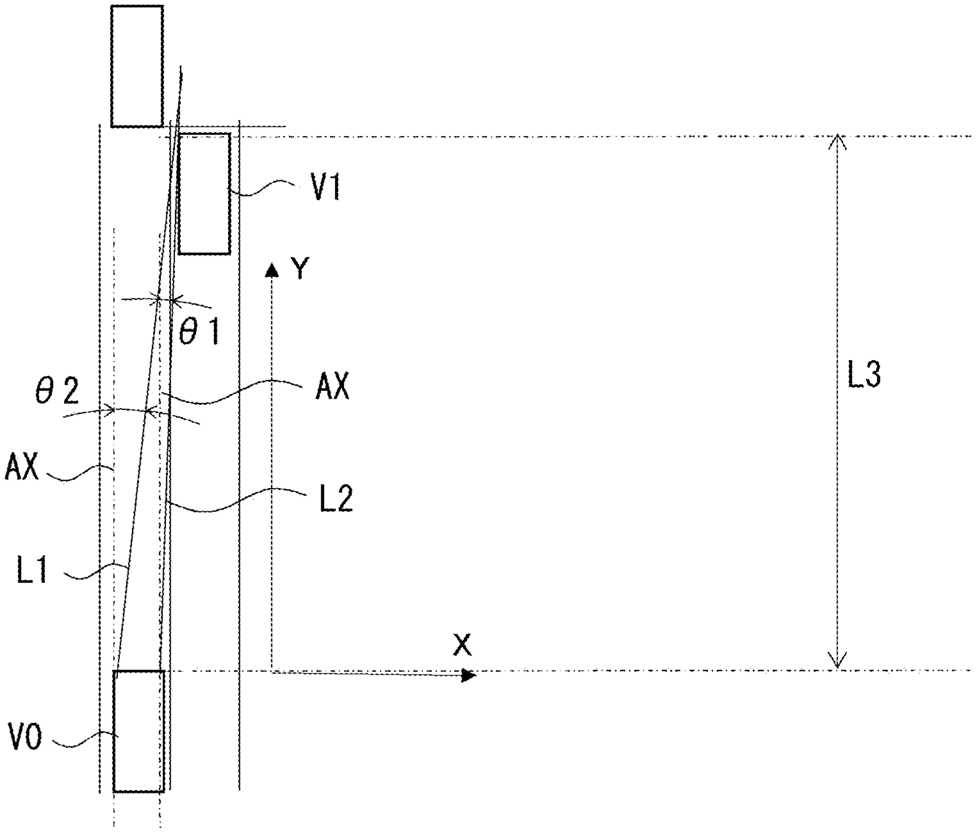
FIG. 6B is a schematic diagram illustrating the situation shown in FIG. 6A.

FIG. 6A is a graph (simulation result) showing the relationship between the left-right angle (lateral angle) and distance in travel direction y between subject vehicle and oncoming vehicle. FIG. 6B is a schematic diagram illustrating the situation shown in FIG. 6A.

In FIG. 6A, the vertical axis represents the left-right angle (lateral angle), while the horizontal axis represents the distance in the travel direction Y between the subject vehicle and the oncoming vehicle. In FIG. 6B, reference sign V0 represents the subject vehicle, and reference sign V1 represents the oncoming vehicle. Hereinafter, the subject vehicle will be denoted as a subject vehicle V0, and the oncoming vehicle will be denoted as an oncoming vehicle V1. In FIG. 6B, reference sign L1 represents a straight line passing through the right rear of the oncoming vehicle V1, which is illuminated by the vehicle light (projection lens 10) mounted on the left front portion of the subject vehicle V0. On the other hand, reference sign L2 represents a straight line passing through the right rear of the oncoming vehicle V1, which is illuminated by the vehicle light (projection lens 10) mounted on the right front portion of the subject vehicle V0.

In FIG. 6A, the solid line represents the relationship between L3 (distance in travel direction y between subject vehicle and oncoming vehicle) and θ1 (lateral angle) shown in FIG. 6B. Meanwhile, the dashed line represents the relationship between L3 (distance in travel direction y between subject vehicle and oncoming vehicle) and θ2 (lateral angle) shown in FIG. 6B.

In the present embodiment, when masking the oncoming vehicle V1 with both the left and right vehicle lamps, the range of the elliptical area C in FIG. 6A—namely, a lateral angle (lateral angle) of 5 degrees and a distance of "25 m"—is adopted to clarify the light-dark boundary (e.g., light-dark boundaries E3 and E4; see FIG. 2). By adopting this range, the influence of differences in the mounting positions of the left and right vehicle lamps (including the projection lens 10) is minimized, and it is expected to achieve effective results when compared over a wide range.

As described above, according to the present embodiment, it is possible to clarify not only a light-dark boundary line (e.g., the light-dark boundary lines E1 and E2 between the first non-irradiation area A1 and the irradiation area A3, see FIG. 2) of a non-irradiation area (e.g., the first non-irradiation area A1) for masking a mask object (e.g., a preceding vehicle) that exists at a long distance in a vicinity of an intersection of the horizontal line H and the vertical line V, but also a light-dark boundary line (e.g., the light-dark boundary lines E3 and E4 between the first non-irradiation area A2 and the irradiation area A3, see FIG. 2) of a non-irradiation area (e.g., the second non-irradiation area A2) for masking a mask object (e.g., an oncoming vehicle) that exists at a close distance laterally displaced from an intersection of a horizontal line and a vertical line.

Next, a modification example will be described.

In the above-described embodiment, the projection lens 10 in which the maximum G value when the left-right angle is 0 degrees is maximum or peak (0.67) in 200 m, and the maximum G value when the left-right angle is 5 degrees is maximum (0.65) in 25 m has been described, but it is not limited to this.

That is, the values of "200 m" and "25 m" may be other numerical values. Furthermore, the left-right angle is not limited to 5 degrees and may be other angles. Additionally, the left-right angle is not limited to a single value of 5 degrees; for example, it may be multiple values such as 5 degrees, 10 degrees, and so on. In that case, the multiple angles may be discrete or continuous.

The numerical values described in the above-described embodiments are all illustrative, and appropriate numerical values different from the numerical values described in the above-described embodiments can be used as a matter of course.

The above-described embodiments are merely illustrative in all aspects. The present disclosure is not limitedly interpreted by the description of the above-described embodiments. The present disclosure can be implemented in other various forms without departing from the spirit or main features of the present disclosure.

This application is based on and claims the benefit of priority from Japanese Patent Application No. 2022-132426 filed on Aug. 23, 2022, the contents of which are hereby incorporated by reference.

REFERENCE SIGNS LIST

1 . . . EXIT SURFACE
2 . . . INCIDENT SURFACE
3 . . . EXIT SURFACE
4 . . . INCIDENT SURFACE
5 . . . EXIT SURFACE
6 . . . INCIDENT SURFACE
10 . . . PROJECTION LENS
20 . . . IMAGE PLANE
A1, A2 . . . NON-IRRADIATION AREAS
A3 . . . IRRADIATION AREA
AX . . . OPTICAL AXIS
B . . . RECTANGLE
C . . . ELLIPTICAL AREA
E1-E4 . . . LIGHT-DARK BOUNDARY
L1-L3 . . . LENS
V0 . . . SUBJECT VEHICLE

The invention claimed is:

1. A lens for vehicular lamp which projects a light distribution image including a non-irradiation area which does not irradiate a mask object and an irradiation area which irradiates other areas, wherein the lens for vehicular lamp is configured to clearly project a first non-irradiation area for masking at least a mask object that exists at a long distance in a vicinity of an intersection of a horizontal line and a vertical line in the light distribution image onto a first location that is a first distance away in an optical axis direction of the lens for vehicular lamp, and a second non-irradiation area for masking at least a mask object that exists at a close distance laterally displaced from an intersection of the horizontal line and the vertical line in the light distribution image onto a second location that is a second distance shorter than the first distance away in a direction inclined at a predetermined angle with respect to the optical axis of the lens for vehicular lamp, wherein a degree of clarity of a light-dark boundary line between the first non-irradiation area and the irradiation area and a degree of clarity of a light-dark boundary line between the second non-irradiation area and the irradiation area are approximately equal, the degree of clarity is a G value, the lens for vehicular lamp comprises one or more lenses, and at least one of the lenses is a meniscus-shaped converging lens having an exit surface, and a radius of curvature of the exit surface is at least twice a thickness of the lens, and the G value indicating the clarity of the light-dark boundary line between the first non-irradiation area and the irradiation area is the maximum G value of the light-dark boundary line projected at 200 m ahead.

2. The lens for vehicular lamp according to claim 1, wherein the lens for vehicular lamp comprises one or more lenses, and the lens has a ratio of thickness to width greater than 0.5.

3. A vehicular lamp, comprising:

a lens for vehicular lamp according to claim 1; and a planar light source that forms the light distribution image on an image surface of the lens for vehicular lamp.

4. A vehicular lamp, comprising:

a light source configured to irradiate a light distribution image including the non-irradiation area and an irradiation area; and the lens according to claim 1, disposed in front of the light source and configured such that illumination light from the light source is incident thereon, wherein the light source is capable of forming the light distribution image including at least a case in which the first non-irradiation region is masked and irradiated and a case in which the second non-irradiation region is masked and irradiated.

5. The lens for vehicular lamp according to claim 1, wherein the second distance is 25 meters ahead.

6. The lens for vehicular lamp according to claim 1, wherein the predetermined angle is a left-right angle with respect to the optical axis and is 5 degrees, 10 degrees, or either 5 degrees and 10 degrees.

7. A lens for vehicular lamp which projects a light distribution image including a non-irradiation area which does not irradiate a mask object and an irradiation area which irradiates other areas, wherein the lens for vehicular lamp is configured to clearly project a first non-irradiation area for masking at least a mask object that exists at a long distance in a vicinity of an intersection of a horizontal line and a vertical line in the light distribution image onto a first location that is a first distance away in an optical axis direction of the lens for vehicular lamp, and a second non-irradiation area for masking at least a mask object that exists at a close distance laterally displaced from an intersection of the horizontal line and the vertical line in the light distribution image onto a second location that is a second distance shorter than the first distance away in a direction inclined at a predetermined angle with respect to the optical axis of the lens for vehicular lamp, a G value of a light-dark boundary line between the first non-irradiation area and the irradiation area, projected at the first location decreases as a horizontal angle relative to an optical axis of the vehicular lamp lens increases, a G value of a light-dark boundary line between the second non-irradiation area and the irradiation area projected at the second location is at its peak when a horizontal angle with respect to an optical axis of the vehicle lamp lens is at a predetermined angle, and becomes smaller as a horizontal angle to an optical axis of the vehicular lamp lens becomes larger than the predetermined angle, and the lens for vehicular lamp comprises one or more lenses, and at least one of the lenses is a meniscus-shaped converging lens having an exit surface, and a radius of curvature of the exit surface is at least twice a thickness of the lens.

8. The lens for vehicular lamp according to claim 7, wherein the maximum value of the G value of a light-dark boundary line between the non-irradiation area and the irradiation area, projected at a long distance separated by the first distance from the vehicular lamp lens and the maximum value of the G value of a light-dark boundary line between the non-irradiation area and the irradiation area projected at a near distance that is the second distance from the vehicle lamp lens are approximately equal.

9. The lens for vehicular lamp according to claim 8, wherein the predetermined angle is a left-right angle with respect to the optical axis and is 5 degrees, 10 degrees, or either 5 degrees and 10 degrees.

10. The lens for vehicular lamp according to claim 7, wherein the lens for vehicular lamp comprises one or more lenses, and the lens has a ratio of thickness to width greater than 0.5.

11. The lens for vehicular lamp according to claim 7, wherein the first distance is 200 meters ahead.

12. The lens for vehicular lamp according to claim 11, wherein the second distance is 25 meters ahead.

13. The lens for vehicular lamp according to claim 7, wherein the predetermined angle is a left-right angle with respect to the optical axis and is 5 degrees, 10 degrees, or either 5 degrees and 10 degrees.

14. A vehicular lamp, comprising:

a light source configured to irradiate a light distribution image including the non-irradiation area and an irradiation area; and the lens according to claim 4, disposed in front of the light source and configured such that illumination light from the light source is incident thereon, wherein the light source is capable of forming the light distribution image including at least a case in which the first non-irradiation region is masked and irradiated and a case in which the second non-irradiation region is masked and irradiated.

* * * * *